US012744992B1

(12) United States Patent
McCauley

(10) Patent No.: US 12,744,992 B1
(45) Date of Patent: Sep. 22, 2026

(54) IMAGE CAPTURE DEVICE ACCESSORY NOTIFICATION

(71) Applicant: GoPro, Inc., San Mateo, CA (US)

(72) Inventor: Grant Adam McCauley, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 125 days.

(21) Appl. No.: 18/813,926

(22) Filed: Aug. 23, 2024

Related U.S. Application Data

(60) Provisional application No. 63/578,901, filed on Aug. 25, 2023.

(51) Int. Cl.
*H04N 23/63* (2023.01)
*H04N 23/55* (2023.01)

(52) U.S. Cl.
CPC ......... *H04N 23/633* (2023.01); *H04N 23/631* (2023.01); *H04N 23/55* (2023.01)

(58) Field of Classification Search
None
See application file for complete search history.

(56) References Cited

U.S. PATENT DOCUMENTS

| | | | | |
|---|---|---|---|---|
| 10,599,016 | B2 * | 3/2020 | Overall | G02B 5/20 |
| 12,248,234 | B2 * | 3/2025 | Sadahiro | G02B 7/02 |
| 2005/0206775 | A1 * | 9/2005 | Shiohara | H04N 23/84 348/E5.042 |
| 2012/0242890 | A1 * | 9/2012 | Nakamoto | G03B 13/36 348/346 |
| 2013/0088636 | A1 * | 4/2013 | Inoue | H04N 23/67 348/346 |
| 2013/0308211 | A1 * | 11/2013 | Okada | G03B 3/10 359/819 |
| 2016/0037050 | A1 * | 2/2016 | Irie | H04N 25/61 348/207.1 |
| 2021/0392245 | A1 * | 12/2021 | Yui | H04N 23/698 |

* cited by examiner

*Primary Examiner* — Twyler L Haskins
*Assistant Examiner* — Wesley J Chiu
(74) *Attorney, Agent, or Firm* — Esplin & Associates, PC

(57) ABSTRACT

An accessory is attached to an image capture device to augment, change, support, supplement, or modify the operation of the image capture device. Attachment of the accessory to the image capture device is detected by the image capture device, and the image capture device provides information on the attachment of the accessory.

20 Claims, 12 Drawing Sheets

METHOD 200

201

Detect attachment of an accessory to an image capture device.

202

Responsive to detection of the attachment of the accessory to the image capture device, effectuate presentation of an accessory element on an electronic display, the accessory element visually indicating the attachment of the accessory to the image capture device.

Image capture device 500

EV # ISO # Macro WB # S #

EV # ISO # ND8 WB # S #

ND16

ND16 △

▽ND16

IMAGE CAPTURE DEVICE ACCESSORY NOTIFICATION

FIELD

This disclosure relates to providing visual notification of an accessory being attached to an image capture device.

BACKGROUND

An accessory may be attached to an image capture device to change the operation of the image capture device in capturing content. For example, an accessory may be attached to the image capture device to change how the image capture device captures visual content, audio content, and/or content. A user of the image capture device may not remember that the accessory is attached to the image capture device or not remember which accessory is attached to the image capture device.

SUMMARY

This disclosure relates to accessory notification. An image capture device may include a housing. The housing may carry one or more of a lens, an image sensor, an electronic display, a processor, and/or other components. The lens may guide light within a field of view to the image sensor. The image sensor may generate a visual output signal conveying visual information defining visual content based on light that becomes incident thereon. The electronic display may be configured to visually present information. Attachment of an accessory to the image capture device may be detected. Responsive to detection of the attachment of the accessory to the image capture device, presentation of an accessory element on the electronic display may be effectuated. The accessory element may visually indicate the attachment of the accessory to the image capture device.

A housing may carry one or more components of an image capture device. The housing may carry (be attached to, support, hold, and/or otherwise carry) one or more of an electronic storage, a lens, an image sensor, an electronic display, a processor, and/or other components. The electronic storage may store information relating to the image capture device, information relating to components of the image capture device, visual information, information relating to an accessory, information relating to attachment of the accessory to the image capture device, information relating to accessory element, and/or other information.

The lens may be configured to guide light within a field of view to the image sensor. The field of view may be less than 180 degrees. The field of view may be equal to 180 degrees. The field of view may be greater than 180 degrees. One or more other lenses may be attached in place of or over the lens.

The image sensor may be configured to generate a visual output signal and/or other output signals based on light that becomes incident thereon and/or other information. The visual output signal may convey visual information and/or other information. The visual information may define visual content.

The electronic display may be configured to visually present information. The electronic display may be configured to present one or more elements.

The processor(s) may be configured by machine-readable instructions. Executing the machine-readable instructions may cause the processor(s) to facilitate accessory notification. The machine-readable instructions may include one or more computer program components. The computer program components may include one or more of a detection component, a notification component, and/or other computer program components.

The detection component may be configured to detect attachment of one or more accessories to the image capture device. In some implementations, an accessory may include another lens. The attachment of the accessory to the image capture device may include attachment of the other lens in place of or over the lens of the image capture device.

The notification component may be configured to, responsive to detection of the attachment of the accessor(ies) to the image capture device, effectuate presentation of one or more accessory elements on the electronic display. An accessory element may visually indicate the attachment of an accessory to the image capture device.

In some implementations, one or more visual characteristics of an accessory may be same as one or more visual characteristics of an accessory element. The visual characteristic(s) of the accessory being the same as the visual characteristic(s) of the accessory element includes the accessory and the accessory element including the same color. The visual characteristic(s) of the accessory being the same as the visual characteristic(s) of the accessory element includes the accessory and the accessory element including the same text.

In some implementations, the accessory element may be presented on the electronic display while the attachment of the accessory to the image capture device is detected. In some implementations, the accessory element may be presented on the electronic display for a duration of time after the attachment of the accessory to the image capture device is detected.

In some implementations, the housing may carry multiple electronic displays. One electronic display may be smaller than the other electronic display. One accessory element may be presented on one display to visually indicate attachment of the accessory to the image capture device and another accessory element may be presented on the other display to visually indicate attachment of the accessory to the image capture device. The accessory elements presented on different electronic displays of the image capture device may be different. The accessory elements presented on different electronic displays of the image capture device being different may include the accessory element presented on the smaller electronic display missing one or more visual characteristics of the accessory element presented on the larger electronic display.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
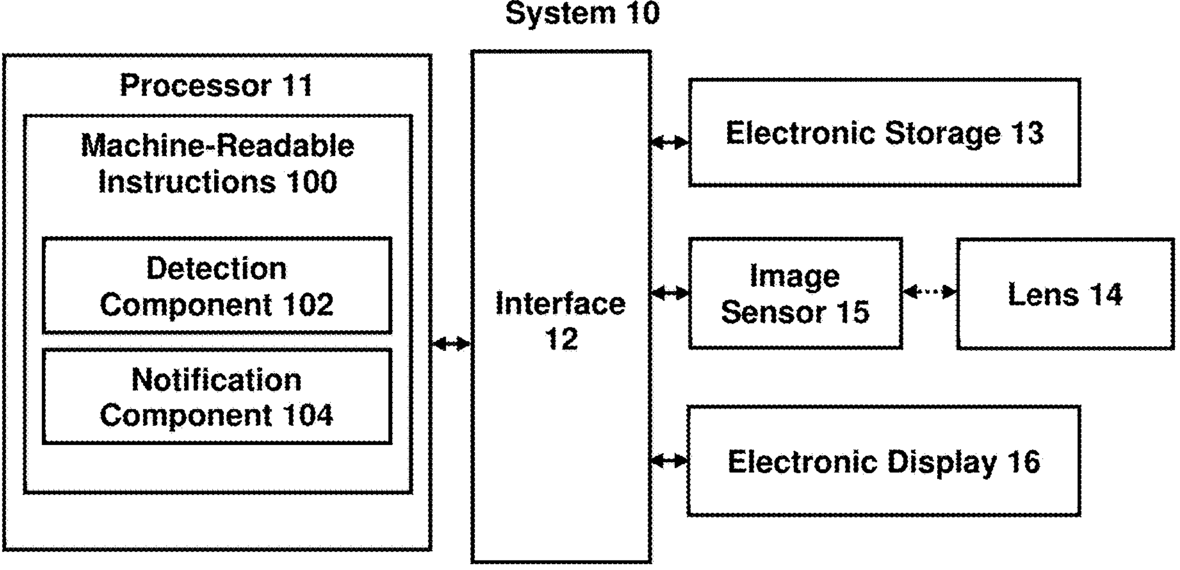
FIG. 1 illustrates an example system for accessory notification.

FIG. 1 illustrates a system 10 for accessory notification. The system 10 may include one or more of a processor 11, an interface 12 (e.g., bus, wireless interface), an electronic storage 13, a lens 14, an image sensor 15, an electronic display 16, and/or other components. The system 10 may include and/or be part of an image capture device. The image capture device may include a housing, and one or more of the processor 11, the interface 12, electronic storage 13, the lens 14, the image sensor 15, the electronic display 16, and/or other components of the system 10 may be carried by the housing of the image capture device. The lens 14 may guide light within a field of view to the image sensor 15. The image sensor 15 may generate a visual output signal conveying visual information based on light that becomes incident thereon. The visual information may define visual content. The electronic display 16 may be configured to visually present information. Attachment of an accessory to the image capture device may be detected by the processor 11. Responsive to detection of the attachment of the accessory to the image capture device, presentation of an accessory element on the electronic display may be effectuated by the processor 11. The accessory element may visually indicate the attachment of the accessory to the image capture device.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, visual information, information relating to an accessory, information relating to attachment of the accessory to the image capture device, information relating to accessory element, and/or other information.

Visual content may refer to content of image(s) (e.g., single image, burst images, video frame(s), and/or video(s)) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length (duration, number of frames) of the video. A video frame may include an image of visual content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device. A field of view of visual content may define a field of view of a scene captured within the visual content. A field of view of visual content may refer to an extent of a scene captured and/or viewable within the visual content. A field of view of visual content may refer to a part of a scene from which light is received for generation of the visual content. For example, an image may include a wide field of view image, such as a panoramic image or a spherical image, and the field of view may of the image may include a wide field of view (e.g., greater than 120 degrees, 360 degrees). Other fields of view are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. For example, the system 10 may be implemented within a computing device (e.g., mobile device, desktop device) separate from the image capture device. The system 10 may be implemented within an image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the lens 14 and/or image sensor 15 of the system 10 may be carried by the housing of the image capture device. The housing may carry other components, such as the processor 11 and/or the electronic storage 13. References to a housing of an image capture device may refer to the image capture device, and vice versa.

An image capture device may refer to a device configured to capture visual content. An image capture device may capture visual content in the form of images, videos, and/or other forms. An image capture device may refer to a device for recording visual information in the form of images, videos, and/or other media. An image capture device may capture other content, such as audio content and/or metadata relating to the visual content and/or audio content. An image capture device may be a standalone device (e.g., camera, action camera, image sensor) or may be part of another device (e.g., part of a smartphone, tablet).

Figure 3A:
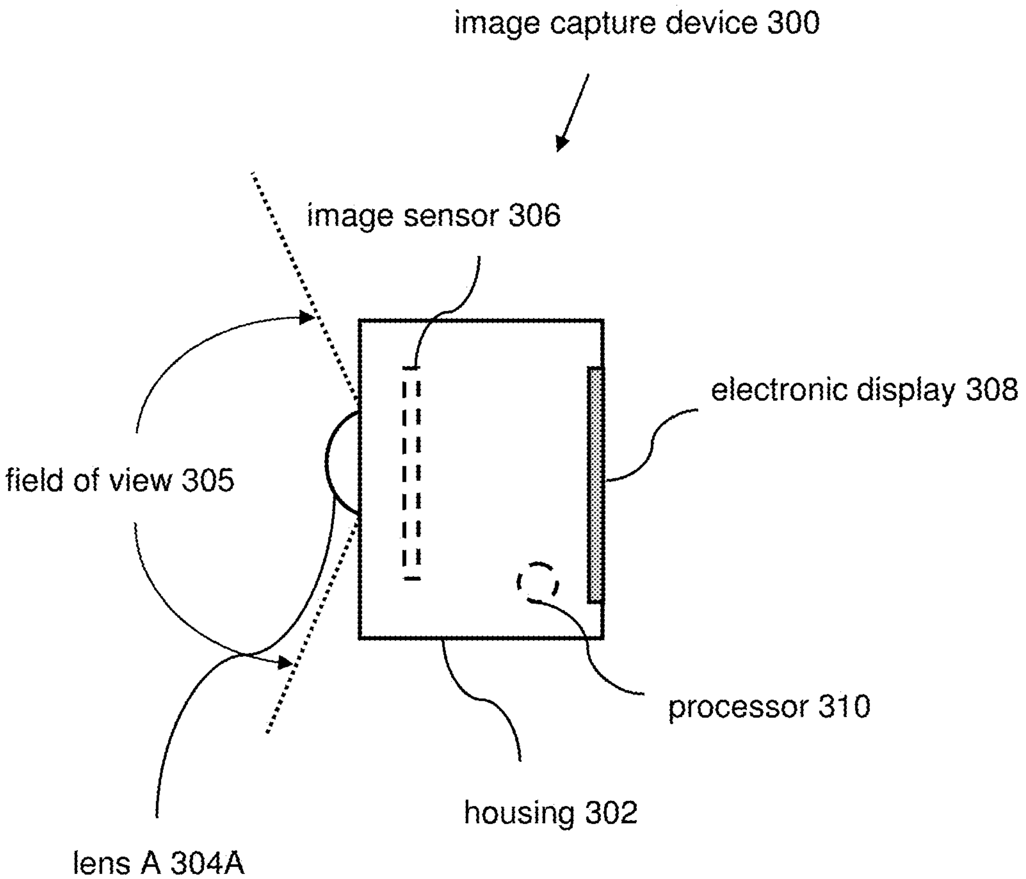
FIG. 3A illustrates an example image capture device.

FIG. 3A illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of a lens A 304, an image sensor 306, an electronic display 308, a processor 310, and/or other components.

One or more components of the image capture device 300 may be the same as, be similar to, and/or correspond to one or more components of the system 10. For example, the processor 310 may be the same as, be similar to, and/or correspond to the processor 11. The lens A 304A may be the same as, be similar to, and/or correspond to the lens 14. The image sensor 306 may be the same as, be similar to, and/or correspond to the image sensor 15. The electronic display 308 may be the same as, be similar to, and/or correspond to the electronic display 16. The image capture device 300 may include other components not shown in FIG. 3. The image capture device 300 may not include one or more components shown in FIG. 3. Other configurations of image capture devices are contemplated.

The field of view may be less than 180 degrees. The field of view may be equal to 180 degrees. The field of view may be greater than 180 degrees.

The lens A 304A may include instrument(s), tool(s), and/or medium that acts upon light passing through the instrument(s)/tool(s)/medium. The lens A 304A may affect direction, deviation, and/or path of the light passing through the lens A 304. The lens A 304A may have a field of view 305. The lens A 304A may be configured to guide light within the field of view 305 to the image sensor 306.

The field of view 305 may include the field of view of a scene that is within the field of view of the lens A 304A and/or the field of view of the scene that is delivered to the image sensor 306. For example, the lens A 304A may guide light within its field of view to the image sensor 306 or may guide light within a portion of its field of view to the image sensor 306. The field of view 305 of the lens A 304A may refer to the extent of the observable world that is seen through the lens A 304. The field of view 305 of the lens A 304A may include one or more angles (e.g., vertical angle, horizontal angle, diagonal angle) at which light is received and passed on by the lens A 304A to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 300 may include multiple lenses. For example, the image capture device 300 may include multiple lenses that are arranged on the housing 302 to capture spherical images/videos (guide light within spherical field of view to one or more images sensors). For instance, the image capture device 300 may include two lenses positioned on opposing sides of the housing 302. The fields of views of the lenses may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The lens A 304A may be configured to guide light within the field of view 305 to the image sensor 306, and the image sensor 306 may be configured to generate visual output signals conveying visual information based on light that becomes incident thereon via the lens A 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include generating, recording, storing, and/or otherwise capturing the visual content. For example, during a capture duration, the visual output signal generated by the image sensor 306 and/or the visual information conveyed by the visual output signal may be used to generate, record, store, and/or otherwise capture the visual content.

In some implementations, the image capture device 300 may include multiple image sensors. For example, the image capture device 300 may include multiple image sensors carried by the housing 302 to capture spherical images/videos based on light guided thereto by multiple lenses. For instance, the image capture device 300 may include two image sensors configured to receive light from two lenses positioned on opposing sides of the housing 302. The fields of views of the lenses may overlap and enable capture of spherical images and/or spherical videos.

The image capture device 300 may include other sensors. For example, the image capture device 300 may include one or more sound sensors (e.g., microphones) to capture audio content, one or more location sensors (e.g., GPS sensors) to measure location of the image capture device, one or more position sensors (e.g., gyroscope, accelerometer, inertial measurement unit) to measure position, movement, and/or orientation of the image capture device, and/or other sensors. In some implementations, information about location, position, and/or movement of the image capture device may be stored as metadata of other content (e.g., visual content, audio content) captured by the image capture device 300.

The electronic display 308 may include an electronic device that provides visual presentation of information. The electronic display 308 may include a color display and/or a non-color display. The electronic display 308 may be configured to visually present information. The electronic display 308 may be configured to present visual content, user interface, and/or other information. User interface (graphical user interface) may include a graphical form that enables a user to interact with the image capture device 300 and/or see information provided by the image capture device 300. The electronic display 308 may be configured to present one or more elements within graphical user interface(s). One or more of the element(s) within a graphical user interface may visually indicate that one or more accessories have been attached to the image capture device 300. In some implementations, the electronic display 308 may include a touchscreen display.

The processor 310 may include one or more processors (logic circuitry) that provide information processing capabilities in the image capture device 300. The processor 310 may provide one or more computing functions for the image capture device 300. The processor may operate/send command signals to one or more components of the image capture device to operate the image capture device. For example, the processor 310 may facilitate operation of the image capture device 300 in capturing image(s) and/or video(s), facilitate operation of the lens A 304A (e.g., change how light is guided by the lens A 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

One or more accessories may be attached to an image capture device. An accessory may refer to a device that augments, changes, supports, supplements, and/or otherwise modifies the operation of the image capture device. An accessory may refer to a device that augments, changes, supports, supplements, and/or otherwise modifies how the image capture device functions to capture content (e.g., visual content, audio content, metadata). An accessory may modify an existing capability of an image capture device or add a new capability to the image capture device. For example, a lens may be attached to an image capture device to modify the existing capability of the image capture device to capture visual content. A sound sensor and/or a metadata sensor (e.g., location sensor, position sensor) may be attached to an image capture device without such sensors to add capability of the image capture device to capture audio content and/or metadata. An accessory may include one or more visual accessories, audio accessories, metadata accessories, and/or other accessories.

A visual accessory may refer to an accessory that augments, changes, supports, supplements, and/or otherwise modifies the operation of the image capture device/how the image capture device functions in capturing visual content. A visual accessory (e.g., lens, optical filter, image sensor) may change how light is guided to the image sensor(s) of the image capture device and/or how light is captured by the image capture device. A visual accessory may be attached to the image capture device to modify the operation/functioning of the image capture device in capturing visual content. For example, a visual accessory may be attached to the image capture device to modify the field of view, the focus distance, the depth of focus, the exposure, the colors, and/or other optical characteristics of the image capture device in capturing visual content.

An audio accessory may refer to an accessory that augments, changes, supports, supplements, and/or otherwise modifies the operation of the image capture device/how the image capture device functions in capturing audio content. An audio accessory (e.g., sound sensor, microphone, noise/wind reducer, foam) may change how sound is received by the image capture device and/or how sound is captured by the image capture device. An audio accessory may be attached to the image capture device to modify the operation/functioning of the image capture device in capturing audio content. For example, an audio accessory may be attached to the image capture device to modify the frequency response, directionality, dampening, and/or other audio characteristics of the image capture device in capturing audio content.

A metadata accessory may refer to an accessory that augments, changes, supports, supplements, and/or otherwise modifies the operation of the image capture device/how the image capture device functions in capturing metadata for other content. A metadata accessory may enable the image capture device to capture one or more additional types of information (other than visual information, audio information). A metadata accessory may be attached to the image capture device to modify the operation/functioning of the image capture device in capturing metadata. For example, a metadata accessory may be attached to the image capture device to enable the image capture device to capture metadata for visual content and/or audio content captured by the image capture device.

An accessory being attached to the image capture device may include the accessory being affixed to, connected to, coupled to, fastened to, joined with, and/or otherwise attached to the image capture device. An accessory may be attached to one or more parts of the image capture device. An accessory may be attached over, under, and/or in place of one or more parts of the image capture device.

Figure 3B:
FIG. 3B illustrates an example image capture device.
Figure 3B:
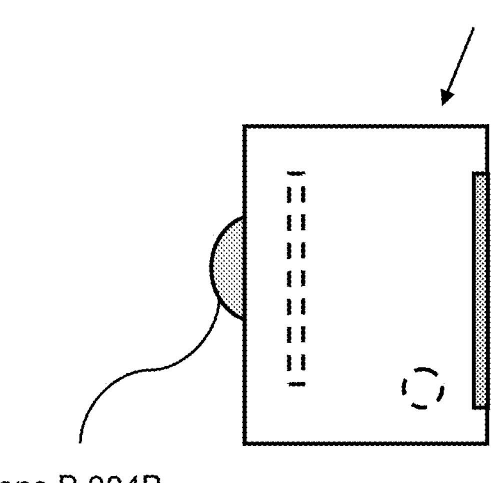
Figure 3C:
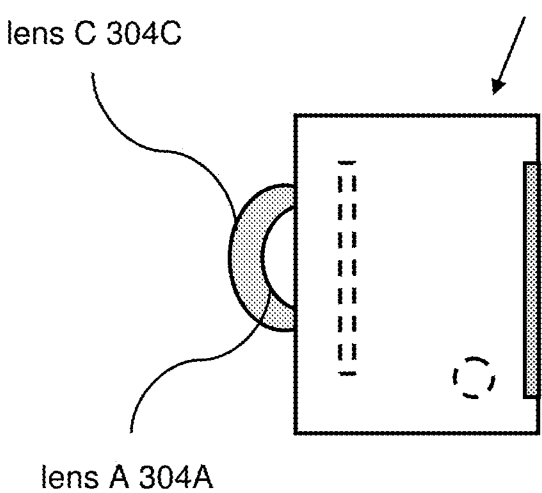
FIG. 3C illustrates an example image capture device.

For example, one or more lenses may be attached in place of or over the lens of the image capture device. For instance, FIG. 3B illustrates a lens B 304B (e.g., macro lens, wide-angle lens) attached to the image capture device 300. The lens B 304B may be different from the lens A 304A of the image capture device 300. Attachment of the lens B 304B to the image capture device 300 may include replacement of the lens A 304A of the image capture device 300. The lens A 304A may be removed from the image capture device 300 and the lens B 304B may be attached in its place. FIG. 3C illustrates a lens C 304C attached to the image capture device 300. Attachment of the lens C 304C to the image capture device 300 may include placement of the lens C 304C over the lens A 304A. The lens C 304C may be attached on top of the lens A 304A. Other attachments of accessories to the image capture device are contemplated.

Providing information on attachment of accessor(ies) to the image capture device may facilitate use of the image capture device by the user. For example, visual, audio, and/or haptic notification may be provided to the user to indicate that an accessory has been attached to the image capture device, the identity of the accessory attached to the image capture device, and/or other information relating to the accessory attached to the image capture device.

For example, when a different lens has been attached to the image capture device, a graphical user interface for the image capture device may be changed to indicate which lens is currently attached to the image capture device. For instance, the graphical user interface presented on an electronic display (e.g., the electronic display carried by the image capture device, the electronic display of a mobile device communicating with the image capture device) may be modified to present an accessory element corresponding to the accessory attached to the image capture device.

The hardware design of the accessory may be translated into the graphical user interface in a cohesive way to inform the user about the accessory attached to the image capture device. For example, the physical design of the accessory and the virtual design of the accessory element for the accessory may share one or more visual characteristics. For instance, the accessory and the accessory element may have the same color scheme and/or the same text (e.g., same accessory name, use of same font). Other provision of information on accessory attachment of the image capture device is contemplated.

Figure 4:
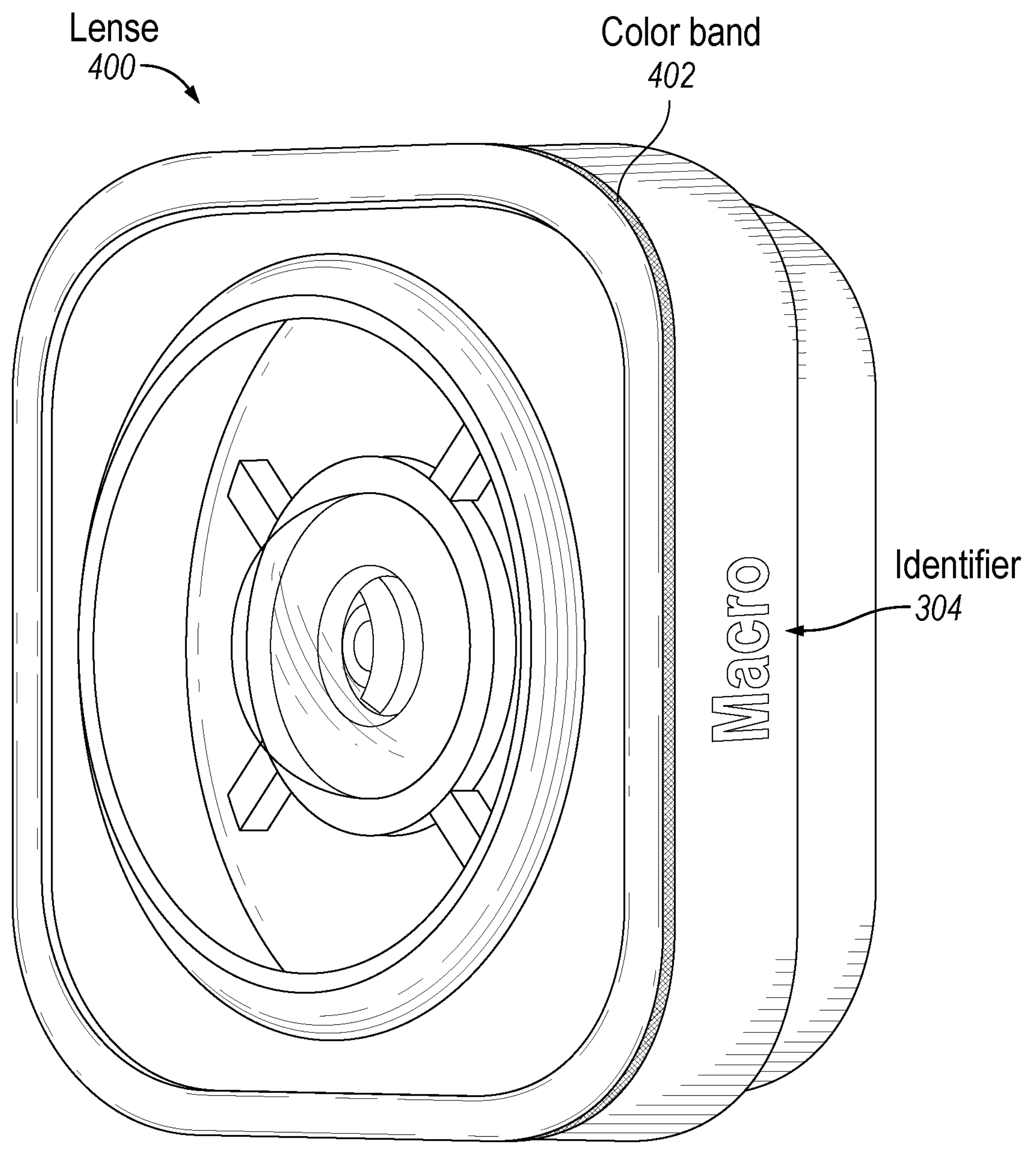
FIG. 4 illustrates an example accessory.

FIG. 4 illustrates an example accessory for an image capture device. The accessory may include a macro lens 400. The macro lens 400 may be attached to an image capture device. The macro lens 400 may be attached in place of or over a lens of the image capture device. The attachment of the macro lens 400 to the image capture device may be detected and one or more accessory elements may be presented on an electronic display. The accessory element may visually indicate the attachment of the macro lens 400 to the image capture device.

Figure 5A:
FIG. 5A illustrates an example graphical user interface presented on an electronic display of an image capture device.
Figure 5A:
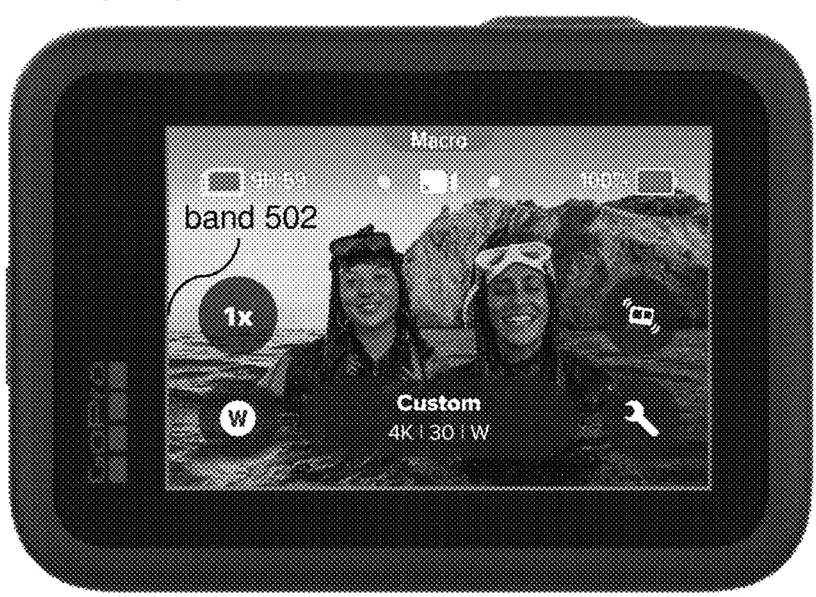

FIG. 5A illustrates an example graphical user interface presented on an electronic display of an image capture device 500. The electronic display shown in FIG. 5A may include a back-facing display of the image capture device 500. The electronic display shown in FIG. 5A may be carried on the side of the image capture device 500 that is opposite the side on which the lens (e.g., the original lens, the macro lens 400) of the image capture device is carried/attached.

The graphical user interface presented on the electronic display shown in FIG. 5A may include one or more accessory elements to visually indicate the attachment of an accessory (e.g., the macro lens 400) to the image capture device. For example, the accessory element(s) on the graphical user interface may include a band 502 (e.g., border) around the periphery of the electronic display. The band 502 around the periphery of the electronic display may indicate that the accessory has been attached to the image capture device. Without the accessory attached to the image capture device, the band 502 may not be presented on the electronic display. While the band 502 is shown as running around the entirety of the periphery of the electronic display, this is merely as an example and is not meant to be limiting. In some implementations, the band 502 may run around one or more parts of the periphery of the electronic display.

As another example, the accessory element(s) on the graphical user interface may include a region in which the accessory that is attached to the image capture device is identified. For example, a text box may be presented on the electronic display, with the text identifying the accessory attached to the image capture device. The text may identify the type of the accessory (e.g., lens vs microphone) attached to the image capture device or the specific type (e.g., macro lens vs wide-angle lens) of the accessory attached to the image capture device. Without the accessory attached to the image capture device, the text box may not be presented on the electronic display. The shape of the text box shown in FIG. 5A is merely provided as an example and is not meant to be limiting. Other shapes of text box are contemplated. Other accessory elements are contemplated. For example, one or more icons may be presented on the electronic display to indicate attachment of an accessory to the image capture device.

Figure 5B:
FIG. 5B illustrates an example graphical user interface presented on an electronic display of an image capture device.

FIG. 5B illustrates an example graphical user interface presented on another electronic display of the image capture device 500. The electronic display shown in FIG. 5B may include a front-facing display of the image capture device 500. The electronic display shown in FIG. 5B may be carried on the same side of the image capture device 500 as the side on which the lens (e.g., the original lens, the macro lens 400) of the image capture device is carried/attached. The electronic display shown in FIG. 5A may be different from the electronic display shown in FIG. 5B. For example, one electronic display (e.g., shown in FIG. 5B) may have a different size and/or have a different shape than the other electronic display (e.g., shown in FIG. 5A). For example, the front-facing display of the image capture device may be smaller than the back-facing display of the image capture device. As another example, the front-facing display of the image capture device may have a 1:1 aspect ratio while the back-facing display of the image capture device may have a different aspect ratio. Other differences in the electronic displays of the image capture device are contemplated.

The graphical user interface presented on the electronic display shown in FIG. 5B may include one or more accessory elements to visually indicate the attachment of an accessory (e.g., the macro lens 400) to the image capture device. For example, the accessory element(s) on the graphical user interface may include a band 512 around the periphery of the electronic display. The band 512 around the periphery of the electronic display may indicate that the accessory has been attached to the image capture device. Without the accessory attached to the image capture device, the band 512 may not be presented on the electronic display.

While the band 512 is shown as running around the entirety of the periphery of the electronic display, this is merely as an example and is not meant to be limiting. In some implementations, the band 512 may run around one or more parts of the periphery of the electronic display. Other accessory elements are contemplated.

The accessory element(s) presented on the electronic display(s) may share one or more same visual characteristics as an accessory corresponding to the accessory elements. One or more visual characteristics of an accessory may be same as one or more visual characteristics of an accessory element. A visual characteristic of an accessory/accessory element may refer to property of the accessory/accessory element than can be seen. A visual characteristic of an accessory/accessory element may include color, shape, text, texture, icon, and/or other visual characteristic. The physical design of an accessory and virtual design of a corresponding accessory element may share the same visual characteristic(s) to provide a unified look for the accessory. For example, the accessory and the accessory element may include the same color, the same text, the same texture, and/or the same icon.

The visual characteristic(s) of the accessory being the same as the visual characteristic(s) of the accessory element includes the accessory and the accessory element including the same color. For example, the lens 400 (shown in FIG. 4) may have a color band 402. The color band 402 may form a complete or a partial loop around the lens 400. The accessory element for the lens 400 may include a band that runs around the electronic display, such as shown in FIGS. 5A and 5B. The band around the electronic display and the color band 402 may have the same color (e.g., both colored red). The texture of the band around the electronic display and the color band 402 may be the same. For example, the color band 402 may have a smooth/uniform texture and the band around the electronic display may have the smooth/uniform texture. As another example, the color and/or the texture of text on the lens 400 may be same as the color and/or the texture of the band around the electronic display.

The visual characteristic(s) of the accessory being the same as the visual characteristic(s) of the accessory element includes the accessory and the accessory element including the same text. The accessory and the accessory element having the same text may include the accessory and the accessory element having same characters (e.g., letters, numbers, symbols) and/or using the same font. For example, the lens 400 (shown in FIG. 4) may have an identifier 304 for the lens 400. The accessory element for the lens 400 may include a text box with the same identifier for the lens 400, such as shown in FIG. 5A. The text box presented on the electronic display may use the same characters as the identifier 304 on the lens 400. The text box presented on the electronic display may use the font as the identifier 304 on the lens 400. The text of the accessory and the accessory element may share other visual characteristics, such as color.

The electronic displays of the image capture device may present different accessory elements/different combinations of accessory elements to visually indicate the attachment of an accessory to the image capture device. That is, the accessory elements presented on different electronic displays of the image capture device may be different. The accessory elements presented on different electronic displays of the image capture device being different may include the accessory element(s) presented on the smaller electronic display missing one or more visual characteristics of the accessory element(s) presented on the larger electronic display. For example, the smaller electronic display shown in FIG. 5B may not include the text box presented on the larger electronic display shown in FIG. 5A. Other differences in presentation of accessory elements on different electronic displays are contemplated.

Referring back to FIG. 1, the processor 11 (or one or more components of the processor 11) may be configured to obtain information to facilitate accessory notification. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate accessory notification. The machine-readable instructions 100 may include one or more computer program components. The machine-readable instructions 100 may include one or more of a detection component 102, a notification component 104, and/or other computer program components.

The detection component 102 may be configured to detect attachment of one or more accessories to the image capture device. Detecting attachment of an accessory to the image capture device may include one or more of determining, discerning, discovering, finding, identifying, spotting, and/or otherwise detecting the attachment of the accessory to the image capture device. Detecting attachment of an accessory to the image capture device may include detecting if and/or when the accessory is attached to the image capture device. Detecting attachment of an accessory to the image capture device may include detecting if and/or when the accessory is not attached to the image capture device. Attachment of an accessory to the image capture device may be detected electrically, magnetically, mechanically, and/or through other techniques. For example, the image capture device and/or the accessory may include electronical, magnetic, and/or mechanical components that lets the image capture device know when the accessory is (and/or is not) attached to the image capture device. Attachment of an accessory to the image capture device may be detected based on analysis of content (e.g., visual content, audio content, metadata) captured by the image capture device.

The notification component 104 may be configured to, responsive to detection of the attachment of the accessor(ies) to the image capture device, provide notification of the attachment of the accessor(ies) to the image capture device. Providing notification of the attachment of the accessor(ies) to the image capture device may include advising, alerting, announcing, declaring, disclosing, informing, revealing, warning, and/or otherwise notifying the user that the accessor(ies) are attached to the image capture device. The notification may be provided visually, audibly, haptically, and/or through other types of communication.

For example, responsive to detection of the attachment of the accessor(ies) to the image capture device, the notification component 104 may be configured to effectuate presentation of one or more accessory elements on the electronic display 16. Responsive to detection of non-attachment of the accessor(ies) to the image capture device, the accessory element(s) may not be presented on the electronic display 16. An accessory element may visually indicate attachment of an accessory to the image capture device. Different accessory elements may visually indicate attachment of different accessories to the image capture device. The identity of the accessory attached to the image capture device may be conveyed by one or more visual characteristics of the accessory element. For example, the identity of the accessory attached to the image capture device may be conveyed by color, shape, text, texture, and/or other visual characteristic of the accessory element. For instance, different lenses being attached to the image capture device may result in different colored bands being presented around the electronic display 16.

The notification component 104 may be configured to effectuate presentation of one or more graphical user interfaces on the electronic display 16. A graphical user interface may refer to a user interface that provides information a user and/or enables a user to interact with the system 10 through one or more user interface element. A graphical user interface may include a static configuration of user interface elements and/or dynamic configurations of user interface elements that changes (e.g., with time, based on attachment of accessor(ies) to the image capture device). Multiple/different user interface elements may be presented/included within the graphical user interface at the same time, may be presented/included within the graphical user interface at different times, and/or may be presented/included within the graphical user interface responsive to attachment/detachment of accessor(ies) from the image capture device, and/or other information.

A user interface element may refer to a graphical element of the graphical capture user interface, such as window, icon, button, graphic, and/or other visual indicator. A user interface element may visually provide information and/or enable a user to provide inputs to the system 10. For example, a user interface element may visually provide information determined by the system 10 and/or a user may interact (e.g., engage, toggle, manipulate) with a user interface element to provide one or more input to the system 10. An accessory element may include a user interface element that visually provides information on the attachment of accessor(ies) to the image capture device.

The notification component 104 may provide visual notification of the attachment of the accessor(ies) to the image capture device through the electronic display 16 and/or through other visual devices. For example, the notification component 104 may provide visual notification of the attachment of the accessor(ies) to the image capture device via use of one or more accessory elements on the electronic display 16. The notification component 104 may provide visual notification of the attachment of the accessor(ies) to the image capture device via use of other visual devices, such as one or more lights (e.g., LED/notification light(s)) carried by the image capture device. For example, the image capture device may carry a notification light used to convey information relating to operation of the image capture device, such as when recording has started and/or is ongoing. The notification light may be turned on and/or controlled to provide information when the attachment of the accessor(ies) to the image capture device is detected. In some implementations, the notification light may be controlled to provide different colors. The colors provided by the notification light may be controlled to match the color of the accessory attached to the image capture device.

In some implementations, one or more visual characteristics of an accessory may be same as one or more visual characteristics of an accessory element for the accessory. The visual characteristic(s) of the accessory being the same as the visual characteristic(s) of the accessory element for the accessory may include the accessory and the accessory element including the same color and/or including the same text, such as shown in and described with respect to FIGS. 4, 5A and 5B. Other matching visual characteristics of an accessory and an accessory element are contemplated.

In some implementations, one or more visual characteristics of an accessory may be different from one or more visual characteristics of an accessory element for the accessory. The visual characteristic(s) of the accessory being different from the visual characteristic(s) of the accessory element for the accessory may include the accessory and the accessory element including different colors, including different text, and/or including different elements. For example, the accessory and the accessory element may include different colored bands. As another example, the accessory may not include a band (e.g., colored band, non-colored band) while the accessory element may include a band (e.g., colored band, non-colored band). The visual characteristic(s) of the accessory being different from the visual characteristic(s) of the accessory element for the accessory may include the accessory including text to identify the accessory while the accessory element may include graphical symbols and/or icons to identify the accessory and/or indicate attachment of the accessory to the image capture device. Other differences in visual characteristics of an accessory and an accessory element are contemplated.

In some implementations, one or more accessory elements may be presented on the electronic display 16 while the attachment of an accessory to the image capture device is detected. The accessory element(s) may be presented while the accessory is attached to the image capture device. In some implementations, one or more accessory elements may be presented on the electronic display 16 for a duration of time after the attachment of the accessory to the image capture device is detected. The accessory element(s) may be presented when the accessory is attached to the image capture device, and the accessory element(s) may disappear after the duration of time.

In some implementations, one or more accessory elements may be presented on the electronic display 16 during capture of content by the image capture device. The accessory element(s) may be presented while the image capture device is operating to capture content (e.g., visual content, audio content, metadata) with the accessory attached to the image capture device. The accessory element(s) may be presented while the electronic display 16 is on during capture of content by the image capture device. In some implementations, one or more accessory elements may be presented on the electronic display 16 for a duration of time after the content capture by the image capture device has started. The accessory element(s) may be presented when content capture has stared with the accessory attached to the image capture device, and the accessory element(s) may disappear after the duration of time.

In some implementations, the housing may carry multiple electronic displays. One electronic display may be smaller than the other electronic display. One accessory element may be presented on one display to visually indicate attachment of the accessory to the image capture device and another accessory element may be presented on the other display to visually indicate attachment of the accessory to the image capture device. The accessory elements presented on different electronic displays of the image capture device may be different. The accessory elements presented on different electronic displays of the image capture device being different may include the accessory element(s) presented on the smaller electronic display missing one or more visual characteristics of the accessory element(s) presented on the larger electronic display, such as shown in and described with respect to FIGS. 5A and 5B.

Figure 6A:
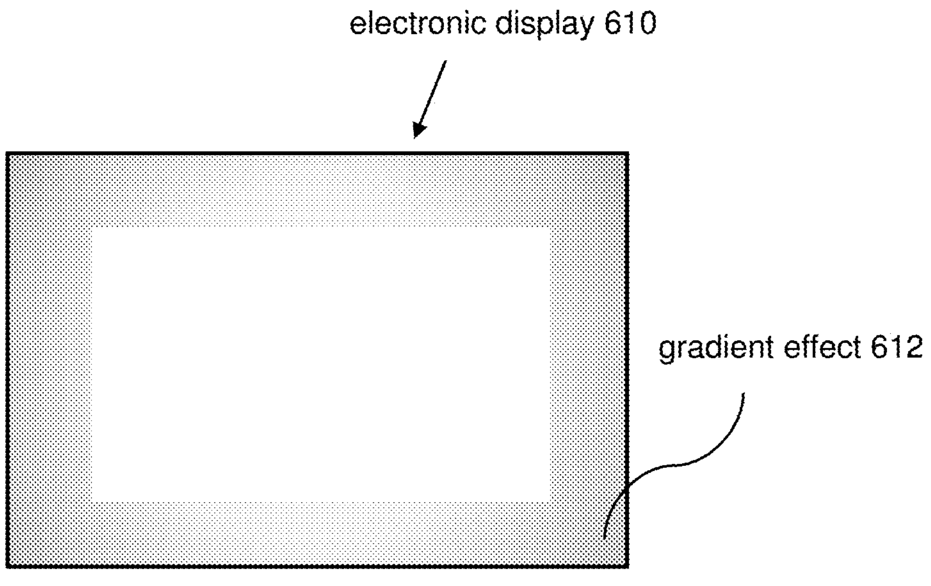
FIG. 6A illustrates an example accessory element presented on an electronic display of an image capture device.
Figure 6B:
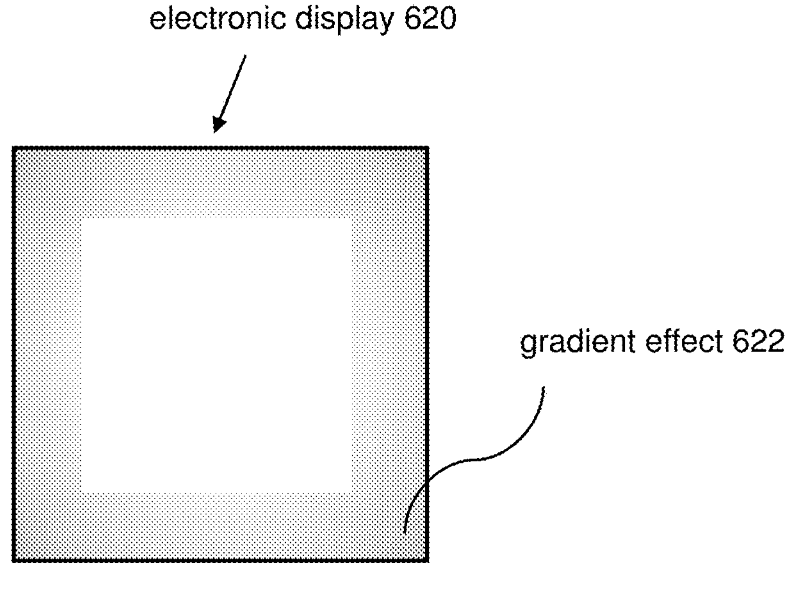
FIG. 6B illustrates an example accessory element presented on an electronic display of an image capture device.

FIG. 6A illustrates an example accessory element presented on an electronic display 610 of an image capture device. The electronic display 610 may be a back-facing display of the image capture device. The accessory element presented on the electronic display 610 may include a gradient effect 612 that appears around the periphery of the electronic display 610. FIG. 6B illustrates an example accessory element presented on an electronic display 620 of an image capture device. The electronic display 620 may be a front-facing display (smaller and differently shaped than the electronic display 610) of the image capture device. The accessory element presented on the electronic display 620 may include a gradient effect 622 that appears around the periphery of the electronic display 620.

The gradient effect 612, 622 may include a gradient of color that appears as a band around the periphery of the electronic display 610, 620. The gradient effect 612, 622 may appear in response to detection of attachment of an accessory to the image capture device. Different types (e.g., different colors, different patterns) of the gradient effect 612, 622 may appear for different types of accessories. For example, the gradient effect 612, 622 may have blue/bluish color when attachment of a lens (e.g., lens mod, macro lens, anamorphic lens, ultra wide lens) is detected while the gradient effect 612, 622 may have yellow/yellowish color when attachment of a neural density (ND) filter (e.g., ND4, ND8, ND16, ND32) is detected. Use of other colors and other accessories are contemplated.

The gradient effect 612, 622 may be temporarily presented on the electronic display 610, 620. For example, when the attachment of the accessory (e.g., lens, ND filter) is detected, the gradient effect 612, 622 may fade in and fade out (e.g., fade in for 0.5 second and fade out for 0.5 second). The gradient effect 612, 622 may be presented on the electronic display 610, 620 while the accessory is attached to the image capture device.

An accessory element may include one or more icons. The icon(s) may indicate attachment of an accessory to the image capture device. Presentation of an accessory element may include presentation of new icon(s) and/or modification of icon(s) already being presented on an electronic display. For example, the electronic display may present an icon to represent the capture mode in which the image capture device is operating. Different icons may represent different capture modes (e.g., video capture mode, image capture mode, time-lapse capture mode). Responsive to detection of attachment of an accessory to the image capture device, the icons representing the capture modes may be modified to include visual indication of the attached accessory. For example, a badge representing the attached accessory may be added to the icon. Other information relating to the attached accessory may be presented with the modified icon.

Figure 7A:
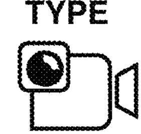
FIG. 7A illustrates an example lens accessory element for video capture mode.

FIG. 7A illustrates an example lens accessory element for video capture mode. A badge representing a lens may be added to the icon for video capture mode based on detection of the lens attached to the image capture device. For instance, in FIG. 7A, a lens badge may be added to the upper left of the video capture mode icon. The lens badge may have the same color (blue/bluish) as the gradient effect presented for the lens accessory. The type of the lens (e.g., lens mod, macro lens, anamorphic lens, ultra wide lens) attached to the image capture device may be presented with (e.g., above) the modified icon.

Figure 7B:
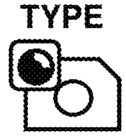
FIG. 7B illustrates an example lens accessory element for image capture mode.

FIG. 7B illustrates an example lens accessory element for image capture mode. A badge representing a lens may be added to the icon for image capture mode based on detection of the attached to the image capture device. For instance, in FIG. 7B, a lens badge may be added to the upper left of the image capture mode icon. The type of the lens (e.g., lens mod, macro lens, anamorphic lens, ultra wide lens) attached to the image capture device may be presented with (e.g., above) the modified icon.

Figure 7C:
FIG. 7C illustrates an example ND filter accessory element for video capture mode.

FIG. 7C illustrates an example ND filter accessory element for video capture mode. A badge representing an ND filter may be added to the icon for video capture mode based on detection of the ND filter attached to the image capture device. For instance, in FIG. 7C, an ND filter badge may be added to the upper left of the video capture mode icon. The ND filter badge may have the same color (yellow/yellowish) as the gradient effect presented for the ND filter accessory. The type of the ND filter (e.g., ND4, ND8, ND16, ND32) attached to the image capture device may be presented with (e.g., above) the modified icon.

Figure 7D:
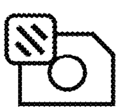
FIG. 7D illustrates an example ND filter accessory element for image capture mode.

FIG. 7D illustrates an example ND filter accessory element for image capture mode. A badge representing an ND filter may be added to the icon for image capture mode based on detection of the ND filter attached to the image capture device. For instance, in FIG. 7D, an ND filter badge may be added to the upper left of the image capture mode icon. The type of the ND filter (e.g., ND4, ND8, ND16, ND32) attached to the image capture device may be presented with (e.g., above) the modified icon. Other icons for capture modes and other badges for accessories are contemplated.

Figures 8A, 8B:
FIG. 8A illustrates an example lens accessory element and capture setting information.
FIG. 8B illustrates an example ND filter accessory element and capture setting information.

Information on capture settings of the image capture device may be presented on an electronic display. Information on capture settings of the image capture device may be presented with or without the accessory element. FIGS. 8A and 8B show example capture settings presented with accessory elements. In FIG. 8A, a video capture mode icon with a lens badge may be presented. The type of the lens (macro) may be presented above the icon. Adjacent to the type of the lens may include values of exposure value, ISO, white balance, and shutter speed. In FIG. 8B, a video capture mode icon with an ND filter badge may be presented. The type of the ND filter (ND8) may be presented above the icon. Adjacent to the type of the ND filter may include values of exposure value, ISO, white balance, and shutter speed. Presentation of information on other capture settings is contemplated.

An accessory icon may provide information on accessory attached to the image capture device and/or information on accessory suggestion for the image capture device. For example, responsive to attached of an ND filter to the image capture device, the image capture device may perform metering to determine whether sufficient amount of light is being received by the image sensor. Based on insufficient/too much light being received by the image sensor, the image capture device may recommend changing ND filter (to lower/higher value ND filter).

The recommendation to change the ND filter may be presented with information on the current ND filter attached to the image capture device. For example, an accessory icon may provide information on the value of the ND filter attached to the image capture device along with recommendation to change to a lower/higher value ND filter. For example, an up arrow (e.g., triangle with pointed end up) may be presented as a recommendation to change to a higher value ND filter while a down arrow (e.g., triangle with pointed end down) may be presented as a recommendation to change to a lower value ND filter. The arrows may be presented on the same side or opposite sides of the accessory icon. For example, the arrows may be presented to the left, to the right, above, or below the accessory icon (e.g., to the left, to the right, above, or below the text identifying the current ND filter attached to the image capture device). As another example, the down arrows may be presented to the left of the accessory icon (e.g., to the left of the text identifying the current ND filter attached to the image capture device) while the up arrows may be presented to the right of the accessory icon (e.g., to the right of the text identifying the current ND filter attached to the image capture device), or vice versa. As yet another example, the down arrows may be presented below the accessory icon (e.g., below the text identifying the current ND filter attached to the image capture device) while the up arrows may be presented above the accessory icon (e.g., above the text identifying the current ND filter attached to the image capture device), or vice versa.

The recommendation to change the ND filter may be presented separately from information on the current ND filter attached to the image capture device. For example, the accessory icon may change/switch between showing information on the current ND filter attached to the image capture device and the information on the recommended change to the ND filter.

Figure 9A:
FIG. 9A illustrates an example ND filter accessory element.
Figure 9B:
FIG. 9B illustrates an example ND filter accessory element.
Figure 9C:
FIG. 9C illustrates an example ND filter accessory element.

FIGS. 9A-9C illustrates example ND filter accessory elements. The ND filter accessory element shown in FIG. 9A may indicate that an ND16 filter has been attached to the image capture device. The ND filter accessory element shown in FIG. 9B may provide information on ND filter change recommendation. In FIG. 9B, the ND filter accessory element may recommend usage of a higher value (e.g., ND32) filter. Recommendation to increase the value of the ND filter may be indicated by the up arrow (e.g., triangle with pointed end up) positioned to the right of the label for the current ND filter attached to the image capture device. The ND filter accessory element shown in FIG. 9C may provide information on ND filter change recommendation. In FIG. 9C, the ND filter accessory element may recommend usage of a lower value (e.g., ND8) filter. Recommendation to decrease the value of the ND filter may be indicated by the down arrow (e.g., triangle with pointed end down) positioned to the left of the label for the current ND filter attached to the image capture device.

Figure 10A:
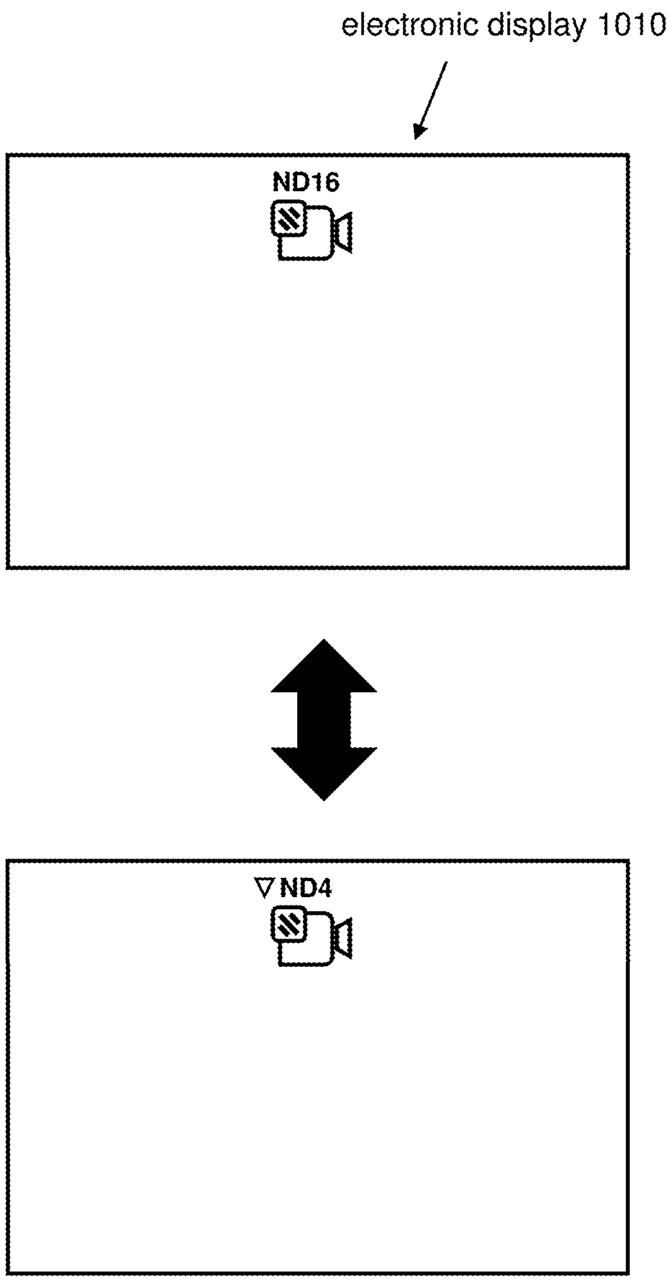
FIG. 10A illustrates an example ND filter accessory element presented on an electronic display of an image capture device.

The accessory element may change to show information on the accessory currently attached to the image capture device and information on the accessory recommended for the image capture device. For example, FIG. 10A illustrates an example ND filter accessory element presented on an electronic display 1010 of an image capture device. The electronic display 1010 may be a back-facing display. The ND filter accessory element may switch between showing the value of the ND filter attached to the image capture device (e.g., ND16) and the value of the ND filter recommended for the image capture device (e.g., ND4). The decrease in the value of the ND filter recommended may be shown by a down arrow (e.g., triangle with pointed end down).

Figure 10B:
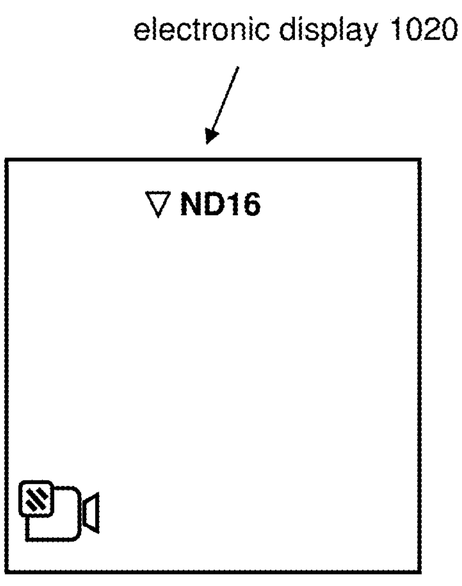
FIG. 10B illustrates an example ND filter accessory element presented on an electronic display of an image capture device.

FIG. 10B illustrates an example ND filter accessory element presented on an electronic display 1020 of an image capture device. The electronic display 1020 may be a front-facing display. Given the smaller size of the electronic display 1020 compared to the electronic display 1010, the attachment of the ND filter to the image capture device may be indicated by the ND filter icon (e.g., on lower, left of the electronic display 1020). The recommendation to change the ND filter may be presented separately (e.g., on top of the electronic display 1020). For example, in FIG. 10B, the value of the ND filter currently attached to the image capture device may be ND16, and recommendation to the decrease the value of the ND filter may be shown by a down arrow (e.g., triangle with pointed end down). As another example, the value of the ND filter currently attached to the image capture device may not be presented on the electronic display 1020 because the ND filter and the electronic display 1020 are on the same side of the image capture device. Instead, the recommendation to increase or decrease the value of the ND filter may be presented on the electronic display 1020 (e.g., via up or down arrow).

An accessory element may not show a recommendation if the recommended accessory is not available. For example, referring to an accessory element for ND filters, an ND32 filter be attached to the image capture device. Metering may determine that too much light is being received by the image sensor of the image capture device. However, ND32 filter may be the highest value ND filter offered by the image capture device manufacturer. Recommendation to increase the value of the ND filter may not be shown when ND32 filter is attached to the image capture device. Similarly, metering may determine that too little light is being received by the image sensor of the image capture device. However, ND4 filter may be the lowest value ND filter offered by the image capture device manufacturer. Recommendation to decrease the value of the ND filter may not be shown when ND4 filter is attached to the image capture device.

An accessory element may indicate when recommended accessory is not available. For example, referring back to the example of ND filters, the highest value ND filter (e.g., ND32) offered by the image capture device manufacturer may be attached to the image capture device. The accessory element may indicate that higher value ND filter is recommended by presenting an up arrow. The accessory element may indicate that the higher value ND filter is not available from the image capture device manufacturer, such as by coloring the up arrow in red. The user of the image capture device may choose to attach a third-party ND filter of higher value and/or make other adjustments to the capture settings of the image capture device (e.g., change exposure value/ISO, etc.).

Responsive to detection of attachment of an accessory to an image capture device, the image capture device may automatically change one or more capture settings. Different capture setting(s) may be associated with different accessories. Particular capture setting(s) may be associated with a particular accessory. Based on detection of an accessory to the image capture device, the image capture device may automatically change its settings to the capture setting(s) associated with the attached accessory. For example, attachment of an ND filter to the image capture device may reduce the amount of light being directed to the image sensor. When an ND filter is attached to the image capture device, the capture setting(s) of the image capture device may be automatically changed to cause the image capture device to capture visual content using specific exposure time, such as using the 180-degree rule (shutter speed being double the frame rate), to achieve cinematic blur, limiting the range of shutter speed/exposure time, and/or using exposure time targeted for stabilization of the visual content. The exposure time may be further modified based on saturation of the visual content to avoid saturated content if capture conditions change (e.g., lighting conditions change). The curve of the ISO used by the image capture device may be automatically changed.

In some implementations, the image capture device may automatically change its settings to the capture setting(s) associated with the attached accessory based on the image capture device operating with AUTO capture setting(s). If the image capture device has been configured with specific user-specified capture settings, those capture settings may not be overridden with capture setting(s) associated with the attached accessory. For example, with respect to the ND filter, the image capture device may automatically change to the exposure setting(s) associated with the ND filter if the exposure setting (e.g., exposure time, shutter time) of the image capture device is set to AUTO. The image capture device may not automatically change to the exposure setting(s) associated with the ND filter if the exposure setting of the image capture device is set to a specific value.

In some implementations, the image capture device may present information on use of the attached accessory and/or information on accessory elements on an electronic display. For example, the first time attachment of a particular accessory/accessory of a particular type is detected, the image capture device may present information on how to use the attached accessory and/or information to interpret the accessory elements presented on an electronic display. For example, the image capture device may present information on how to interpret arrows shown to recommend changes in ND filter value. Presentation of other information is contemplated. Next/subsequent time the same particular accessory/accessory of the same particular type is detected, the image capture device may not present information on how to use the attached accessory and/or information to interpret the accessory elements presented on an electronic display.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13 and the image sensor 15 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
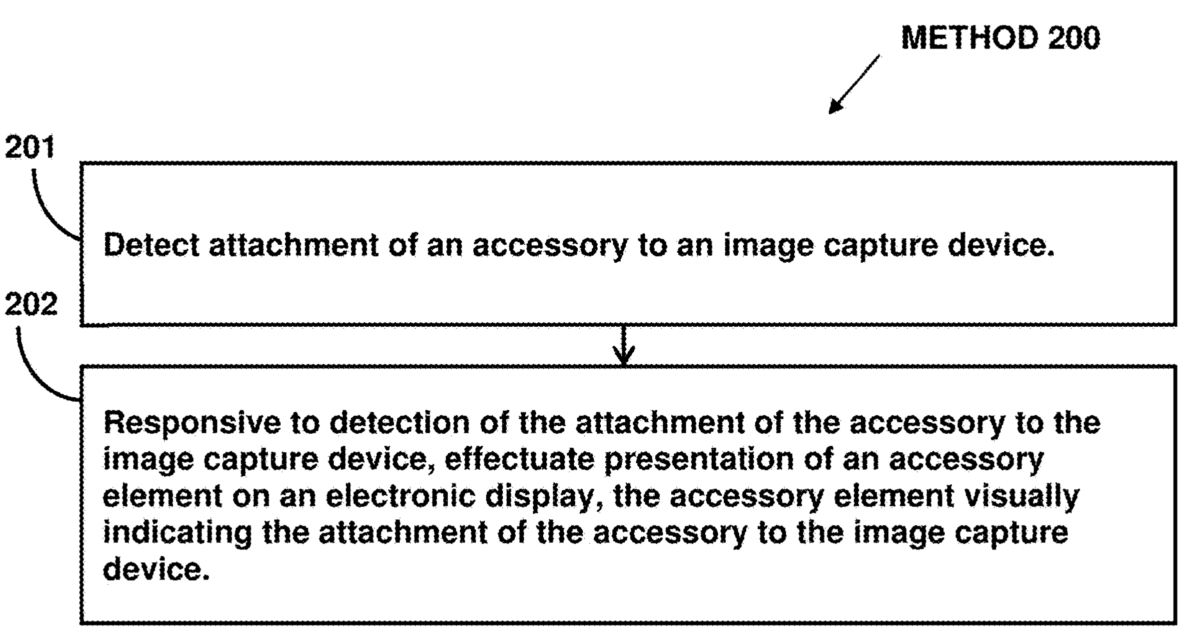
FIG. 2 illustrates an example method for accessory notification.

FIG. 2 illustrates method 200 for accessory notification. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of a lens, an image sensor, an electronic display, a processor, and/or other components. The lens may guide light within a field of view to the image sensor. The image sensor may generate a visual output signal conveying visual information defining visual content based on light that becomes incident thereon. The electronic display may be configured to visually present information.

At operation 201, attachment of an accessory to the image capture device may be detected. In some implementations, operation 201 may be performed by a processor component the same as or similar to the detection component 102 (Shown in FIG. 1 and described herein).

At operation 202, responsive to detection of the attachment of the accessory to the image capture device, presentation of an accessory element on the electronic display may be effectuated. The accessory element may visually indicate the attachment of the accessory to the image capture device. In some implementations, operation 202 may be performed by a processor component the same as or similar to the notification component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for accessory notification, the image capture device comprising:
- a housing;
- a first lens carried by the housing and configured to guide light within a field of view to an image sensor;
- the image sensor carried by the housing and configured to generate a visual output signal conveying visual information based on light that becomes incident thereon, the visual information defining visual content;
- a first electronic display carried by the housing and configured to visually present information;
- a second electronic display carried by the housing, the second electronic display smaller than the first electronic display; and one or more physical processors carried by the housing and configured by machine-readable instructions to:
  - detect attachment of an accessory to the housing; and
  - responsive to detection of the attachment of the accessory to the housing, effectuate presentation of a first accessory element on the first electronic display and a second accessory element on the second electronic display, the first accessory element and the second accessory element visually indicating the attachment of the accessory to the housing, wherein the second accessory element is different from the first accessory element and a visual characteristic of the accessory is the same as a visual characteristic of the first accessory element.

2. The image capture device of claim 1, the visual characteristic of the accessory being the same as the visual characteristic of the first accessory element includes the accessory and the first accessory element including same color or same text.

3. An image capture device for accessory notification, the image capture device comprising:
- a housing;
- a first lens carried by the housing and configured to guide light within a field of view to an image sensor;
- the image sensor carried by the housing and configured to generate a visual output signal conveying visual information based on light that becomes incident thereon, the visual information defining visual content;
- a first electronic display carried by the housing and configured to visually present information; and
- one or more physical processors carried by the housing and configured by machine-readable instructions to:
  - detect attachment of an accessory to the housing; and
  - responsive to detection of the attachment of the accessory to the housing, effectuate presentation of a first accessory element on the first electronic display, the first accessory element visually indicating the attachment of the accessory to the housing,
- wherein a visual characteristic of the accessory is the same as a visual characteristic of the first accessory element, and wherein the visual characteristic of the accessory being the same as the visual characteristic of the first accessory element includes the accessory and the first accessory element including the same color.

4. The image capture device of claim 3, wherein:
the accessory includes a second lens; and
the attachment of the accessory to the housing includes attachment of the second lens in place of or over the first lens.

5. The image capture device of claim 3, wherein the first accessory element is presented on the first electronic display while the attachment of the accessory to the housing is detected.

6. The image capture device of claim 3, wherein the first accessory element is presented on the first electronic display for a duration of time after the attachment of the accessory to the housing is detected.

7. The image capture device of claim 3, wherein the one or more physical processors are further configured to automatically adjust one or more capture settings of the image capture device responsive to the detection of the attachment of the accessory.

8. An image capture device for accessory notification, the image capture device comprising:
a housing;
a first lens carried by the housing and configured to guide light within a field of view to an image sensor;
the image sensor carried by the housing and configured to generate a visual output signal conveying visual information based on light that becomes incident thereon, the visual information defining visual content;
a first electronic display carried by the housing and configured to visually present information;
a second electronic display carried by the housing, the second electronic display smaller than the first electronic display; and
one or more physical processors carried by the housing and configured by machine-readable instructions to:
detect attachment of an accessory to the housing;
responsive to detection of the attachment of the accessory to the housing, effectuate presentation of a first accessory element on the first electronic display, the first accessory element visually indicating the attachment of the accessory to the housing; and
further responsive to detection of the attachment of the accessory to the housing, effectuate presentation of a second accessory element on the second electronic display, the second accessory element being different from the first accessory element, the second accessory element visually indicating attachment of the accessory to the housing.

9. The image capture device of claim 8, wherein the second accessory element being different from the first accessory element includes the second accessory element missing a visual characteristic of the first accessory element.

10. The image capture device of claim 8, wherein the first accessory element comprises a text box identifying a type of the accessory and the second accessory element comprises a graphical icon.

11. The image capture device of claim 8, wherein the first accessory element or the second accessory element includes a gradient effect presented around a periphery of the first electronic display or the second electronic display.

12. A method for accessory notification, the method performed by an image capture device, the image capture device including one or more processors, an image sensor, a first lens, and a first electronic display, the image sensor being configured to generate a visual output signal conveying visual information based on light that becomes incident thereon, the visual information defining visual content, the first lens being configured to guide light within a field of view to the image sensor, the first electronic display being configured to visually present information, the method comprising:
detecting attachment of an accessory to the image capture device; and
responsive to detection of the attachment of the accessory to the image capture device, effectuating presentation of a first accessory element on the first electronic display, the first accessory element visually indicating the attachment of the accessory to the image capture device,
wherein a visual characteristic of the accessory is the same as a visual characteristic of the first accessory element, and wherein the visual characteristic of the accessory being the same as the visual characteristic of the first accessory element includes the accessory and the first accessory element including the same color.

13. The method of claim 12, wherein:
the accessory includes a second lens; and
the attachment of the accessory to the image capture device includes attachment of the second lens in place of or over the first lens.

14. The method of claim 12, wherein the first accessory element is presented on the first electronic display while the attachment of the accessory to the image capture device is detected.

15. The method of claim 12, wherein the first accessory element is presented on the first electronic display for a duration of time after the attachment of the accessory to the image capture device is detected.

16. The method of claim 12, further comprising automatically adjusting one or more capture settings of the image capture device responsive to the detection of the attachment of the accessory.

17. A method for accessory notification, the method performed by an image capture device, the image capture device including one or more processors, an image sensor, a first lens, and a first electronic display, and a second electronic display, the second electronic display being smaller than the first electronic display, the image sensor being configured to generate a visual output signal conveying visual information based on light that becomes incident thereon, the visual information defining visual content, the first lens being configured to guide light within a field of view to the image sensor, the first electronic display and the second electronic display being configured to visually present information, the method comprising:
detecting attachment of an accessory to the image capture device;
responsive to detection of the attachment of the accessory to the image capture device, effectuating presentation of a first accessory element on the first electronic display, the first accessory element visually indicating the attachment of the accessory to the image capture device; and
further responsive to detection of the attachment of the accessory to the image capture device, effectuating presentation of a second accessory element on the second electronic display, the second accessory element being different from the first accessory element, the second accessory element visually indicating attachment of the accessory to the image capture device.

18. The method of claim 17, wherein the second accessory element being different from the first accessory element includes the second accessory element missing a visual characteristic of the first accessory element.

19. The method of claim 17, wherein the first accessory element comprises a text box identifying a type of the accessory and the second accessory element comprises a graphical icon.

20. The method of claim 17, wherein the first accessory element or the second accessory element includes a gradient effect presented around a periphery of the first electronic display or the second electronic display.

* * * * *